(12) United States Patent
Czajkowski (10) Patent No.: US 9,639,326 B2
(45) Date of Patent: *May 2, 2017

(54) FLOATING-POINT ADDER CIRCUITRY

(71) Applicant: Altera Corporation, San Jose, CA (US)

(72) Inventor: Tomasz Czajkowski, Toronto (CA)

(73) Assignee: Altera Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/181,747

(22) Filed: Jun. 14, 2016

(65) Prior Publication Data

US 2016/0291934 A1 Oct. 6, 2016

Related U.S. Application Data

(63) Continuation of application No. 14/019,196, filed on Sep. 5, 2013, now Pat. No. 9,405,728.

(51) Int. Cl.
*G06F 7/485* (2006.01)
*G06F 17/10* (2006.01)
*G06F 7/499* (2006.01)
*G06F 5/01* (2006.01)

(52) U.S. Cl.
CPC .............. *G06F 7/485* (2013.01); *G06F 5/012* (2013.01); *G06F 7/49915* (2013.01); *G06F 17/10* (2013.01); *G06F 2207/483* (2013.01)

(58) Field of Classification Search
None
See application file for complete search history.

(56) References Cited

U.S. PATENT DOCUMENTS

| | | | |
|---|---|---|---|
| 5,128,889 | A | 7/1992 | Nakano |
| 5,200,916 | A | 4/1993 | Yoshida |
| 5,276,634 | A | 1/1994 | Suzuki et al. |
| 5,685,009 | A | 11/1997 | Blomgren et al. |
| 5,761,103 | A | 6/1998 | Oakland et al. |
| 5,892,697 | A | 4/1999 | Brakefield |
| 7,373,369 | B2 | 5/2008 | Gerwig et al. |
| 8,412,756 | B1 | 4/2013 | Langhammar |
| 2008/0215660 | A1 | 9/2008 | Fukumura et al. |

*Primary Examiner* — Michael D Yaary (57) ABSTRACT

An integrated circuit is provided that performs floating-point addition or subtraction operations involving at least three floating-point numbers. The floating-point numbers are pre-processed by dynamically extending the number of mantissa bits, determining the floating-point number with the biggest exponent, and shifting the mantissa of the other floating-point numbers to the right. Each extended mantissa has at least twice the number of bits of the mantissa entering the floating-point operation. The exact bit extension is dependent on the number of floating-point numbers to be added. The mantissas of all floating-point numbers with an exponent smaller than the biggest exponent are shifted to the right. The number of right shift bits is dependent on the difference between the biggest exponent and the respective floating-point exponent.

22 Claims, 8 Drawing Sheets

FLOATING-POINT ADDER CIRCUITRY

This application is a continuation of U.S. patent application Ser. No. 14/019,196, filed Sep. 5, 2013, which is hereby incorporated by reference herein in its entirety. This application claims the benefit of and claims priority to U.S. patent application Ser. No. 14/019,196, filed Sep. 5, 2013.

BACKGROUND

This invention relates to performing floating-point arithmetic operations in integrated circuits and, more particularly, to dynamic bit extension and shifting techniques for floating-point operations.

Floating-point operations are usually implemented in accordance with the IEEE754 standard, which defines a floating-point number as having a sign, a mantissa, and an exponent, in which the mantissa is required to be normalized at all times because the standard implies a leading "1." However, performing normalization can be expensive in terms of circuit area and operational latency. Some floating-point operations also require that the floating-point number operands be manipulated as part of a floating-point operation. For example, floating-point addition and subtraction require that the mantissas of the floating-point number operands be aligned in such a way that the exponents of the floating-point number operands are equal.

Situations frequently arise where several floating-point operations are executed sequentially (e.g. in an adder tree). Such sequentially executed operations require the normalization of the mantissa produced by a first adder stage followed by the alignment of the mantissas entering a second adder stage.

SUMMARY

The present invention relates to integrated circuits having improved floating-point operation capabilities. An integrated circuit may have circuitry that performs floating-point operations. This circuitry may receive a first floating-point number having a first exponent and a first mantissa, a second floating-point number having a second exponent and a second mantissa, and a third floating-point number having a third exponent and a third mantissa. Each of the first, second, and third mantissas may have a given precision. The circuitry may expand the given precision of the first, second, and third mantissas to a greater number to produce first, second, and third extended mantissas. The greater number may be at least greater than or equal to the given precision. The circuitry may further right shift the first, second, and third extended mantissas to produce first, second, and third shifted mantissas and compute the sum of the first, second, and third shifted mantissas.

It is appreciated that the present invention can be implemented in numerous ways, such as a process, an apparatus, a system, a device, instructions on a computer readable medium. Several inventive embodiments of the present invention are described below.

In certain embodiments, when shifting the first, second, and third extended mantissas to the right, the above mentioned circuitry may compare the first, second, and third exponents to determine a dominant exponent. The dominant exponent may be equal to a selected exponent that is greater than or equal to each of the first, second, and third exponents. In response to determining that the third exponent is the dominant exponent, the circuitry may subtract the first exponent from the dominant exponent to produce a first number of bits and subtract the second exponent from the dominant exponent to produce a second number of bits.

In other cases, the circuitry may further right shift the first extended mantissa by the first number of bits to produce the first shifted mantissa, right shift the second extended mantissa by the second number of bits to produce the second shifted mantissa, and provide the third extended mantissa as the third shifted mantissas.

Further features of the invention, its nature and various advantages, will be more apparent from the accompanying drawings and the following detailed description of the preferred embodiments.

DETAILED DESCRIPTION

Embodiments of the present invention relate to performing floating-point arithmetic operations in integrated circuits and, more particularly, to dynamic bit extension and shifting techniques for floating-point operations.

Floating-point operations are usually implemented in accordance with the IEEE754 standard, which defines a floating-point number as having a sign, a mantissa, and an exponent, and where the mantissa is required to be normalized at all times because the standard implies a leading "1." Furthermore, floating-point addition and subtraction require that the mantissas of the floating-point number operands be aligned in such a way that the exponents of the floating-point number operands are equal in value.

Situations frequently arise where several floating-point addition or subtraction operations are executed sequentially (e.g., the addition of more than two numbers in a tree-like structure). Such sequentially executed addition or subtraction operations require the normalization of the mantissa produced by a first floating-point addition or subtraction stage followed by the alignment of the mantissas entering a subsequent floating-point addition or subtraction stage. However, normalization and alignment operations can be expensive in terms of circuit area and operational latency.

It may be desirable to implement a pre-processing stage that eliminates the normalization and alignment operations before and in between successive floating-point addition or subtraction operations, thereby removing potential inefficiencies.

It will be obvious to one skilled in the art, that the present exemplary embodiments may be practiced without some or all of these specific details. In other instances, well-known operations have not been described in detail in order not to unnecessarily obscure the present embodiments.

Figure 1:
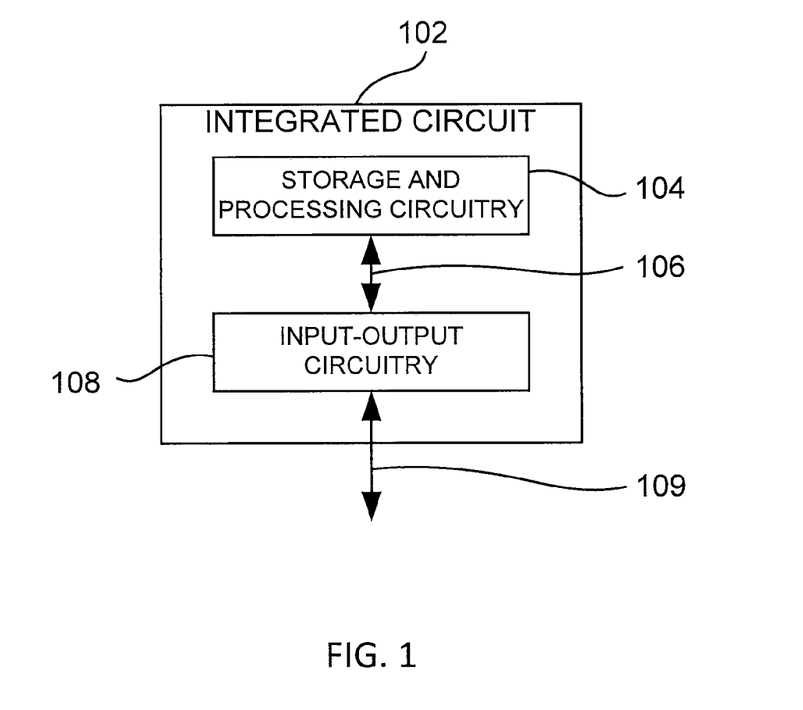
FIG. 1 is a diagram of an illustrative integrated circuit in accordance with an embodiment of the present invention.

An illustrative embodiment of an integrated circuit 102 in accordance with the present invention is shown in FIG. 1.

Integrated circuit 102 may include storage and processing circuitry 104 and input-output circuitry 108. Storage and processing circuitry 104 may include embedded microprocessors, digital signal processors (DSP), microcontrollers, or other processing circuitry. The storage and processing circuitry 104 may further have random-access memory (RAM), first-in first-out (FIFO) circuitry, stack or last-in first-out (LIFO) circuitry, read-only memory (ROM), or other memory elements. Input/output circuitry may include parallel input/output circuitry, differential input/output circuitry, serial data transceiver circuitry, or other input/output circuitry suitable to transmit and receive data. Internal interconnection resources 106 such as conductive lines and busses may be used to send data from one component to another component or to broadcast data from one component to one or more other components. Internal interconnection resources 106 may also include network-on-chip (NoC) or other on chip interconnection resources. External interconnection resources 109 such as conductive lines and busses, optical interconnect infrastructure, or wired and wireless networks with optional intermediate switches may be used to communicate with other devices.

Figure 2:
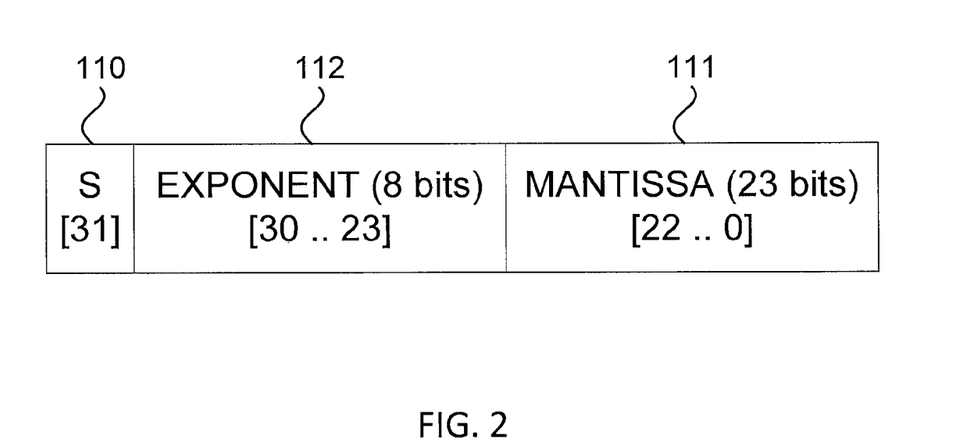
FIG. 2 is a diagram of an illustrative single precision floating-point number in accordance with an embodiment of the present invention.

Floating-point numbers are commonplace for representing real numbers in scientific notation in computing systems and are designed to cover a large numeric range and diverse precision requirements. The IEEE754 standard is commonly used for floating-point numbers. A floating-point number, such as the floating-point number illustrated in FIG. 2 includes three different parts: the sign of the floating-point number 110, the mantissa 111, and the exponent 112. Each of these parts may be represented by a binary number and, in the IEEE754 format, have different bit sizes depending on the precision. For example, a single precision floating-point number such as the floating-point number in FIG. 2 requires 32 bits, which are distributed as follows: one sign bit (bit 31), eight exponent bits (bits [30:23]), and 23 mantissa bits (bits [22:0]). A double precision floating-point number requires 64 bits including one sign bit (bit 63), 11 exponent bits (bits [62:52]), and 52 mantissa bits (bits [51:0]).

According to the IEEE754 standard, a mantissa may also have additional bits. A mantissa that has additional bits is sometimes also referred to as an extended mantissa. For example, an extended, single precision mantissa may have five additional bits (i.e. an extended, single precision mantissa may consist of 28 bits instead of 23 bits). The last three bits added to the right of the least significant bit represent round, guard, and sticky bits.

Round and guard bits may provide additional accuracy when performing arithmetic operations. For example, dividing a mantissa with a '1' in the least significant bit position by two may result in the round bit to become '1'. An additional division by two may result in the guard bit to become '1'. Thus, round and guard bits enable the representation of numbers that are smaller than a mantissa without these additional bits may be able to represent accurately. The sticky bit may record any bits of value '1' that are shifted beyond the precision of the mantissa by performing a logical OR operation with the round and guard bits.

The two remaining bits are added beyond the most significant bit position and may absorb any overflow produced by a floating-point arithmetic operation.

The sign of a floating-point number according to standard IEEE754 is represented using a single bit, where a "0" denotes a positive number and a "1" denotes a negative number.

The exponent of a floating-point number preferably is an unsigned binary number which, for the single precision format, ranges from 0 to 255. In order to represent a very small number, it is necessary to use negative exponents. Thus, the exponent preferably has a negative bias. For single precision floating-point numbers, the bias preferably is −127. For example a value of 140 for the exponent actually represents (140−127)=13, and a value of 100 represents (100−127)=−27. For double precision numbers, the exponent bias preferably is −1023.

As discussed above, according to the IEEE754 standard, the mantissa is a normalized number (i.e., it has no leading zeroes and represents the precision component of a floating point number). Because the mantissa is stored in binary format, the leading bit can either be a 0 or a 1, but for a normalized number it will always be a 1. Therefore, in a system where numbers are always normalized, the leading bit need not be stored and can be implied, effectively giving the mantissa one extra bit of precision.

Figure 3:
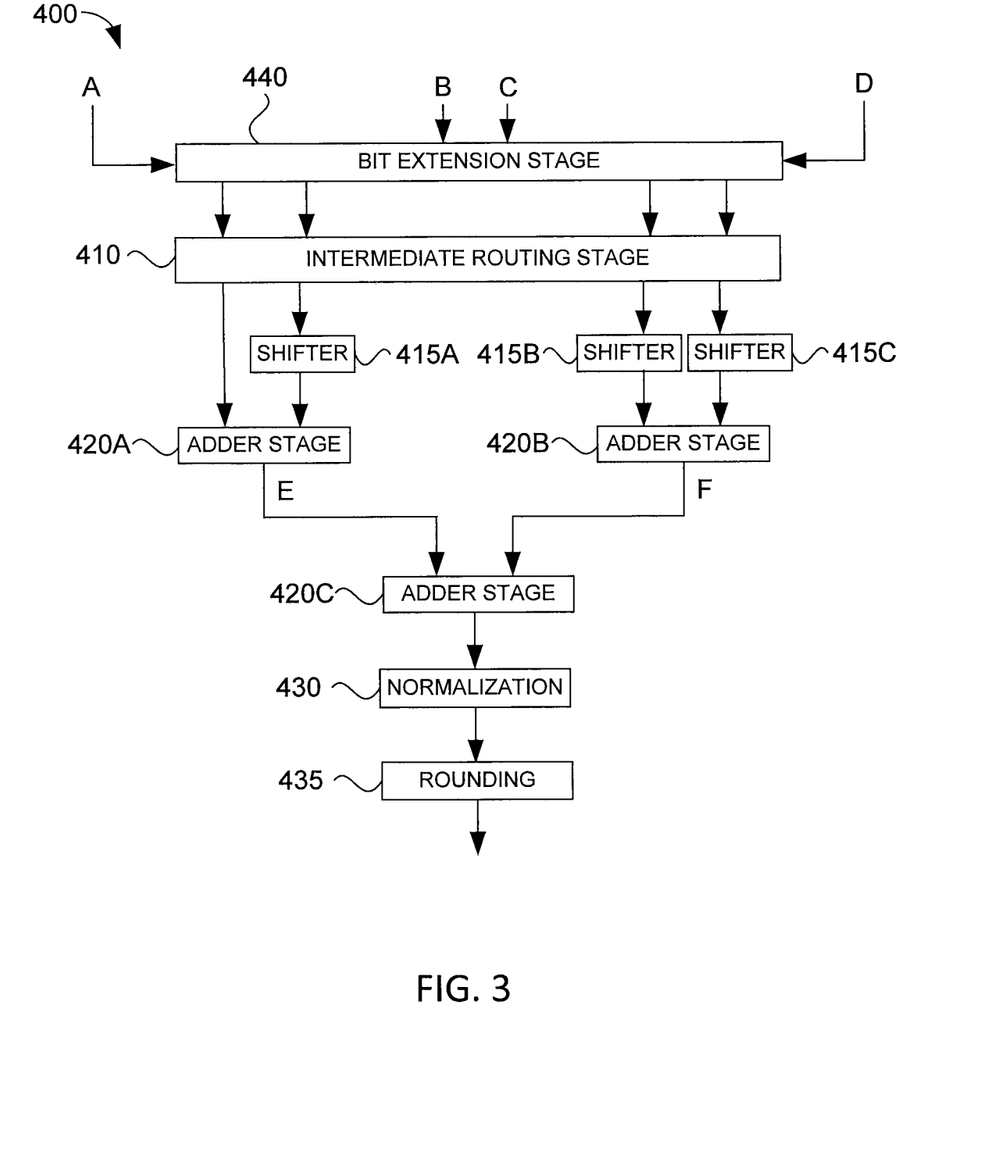
FIG. 3 is a diagram of two illustrative successive floating-point adder stages in accordance with an embodiment of the present invention.

Consider a scenario where four floating-point numbers (e.g., A, B, C, and D) are added together. An illustrative diagram of the addition of these four floating-point numbers by an adder tree such as adder tree 400 is shown in FIG. 3. Adder tree 400 may include a bit extension stage 440, an intermediate routing stage 410, shifters 415A, 415B, and 415C, adder stages 420A, 420B, and 420C, a normalization stage 430, and a rounding stage 435. Adder tree 400 as shown in FIG. 3 is merely illustrative and is not intended to limit the scope of the present invention. If desired, adder tree 400 may have more or less adder stages, adder tree 400 may receive three or more than four floating-point numbers, adder tree 400 may be arranged differently. For example, the order of bit extension stage and intermediate routing stage may be reversed; adder stage 420A may be coupled to shifters 415A and 415B while adder stage 420B is coupled to shifter 415C and intermediate routing stage 410, etc.

As shown in FIG. 3, floating-point numbers A, B, C, and D may be received by bit extension stage 440. Floating-point numbers A, B, C, and D may each have a sign, an exponent, and a mantissa. Bit extension stage 440 may extend the number of bits that represent the mantissas of each of the four received floating point numbers, thereby producing corresponding extended mantissas.

Figure 5:
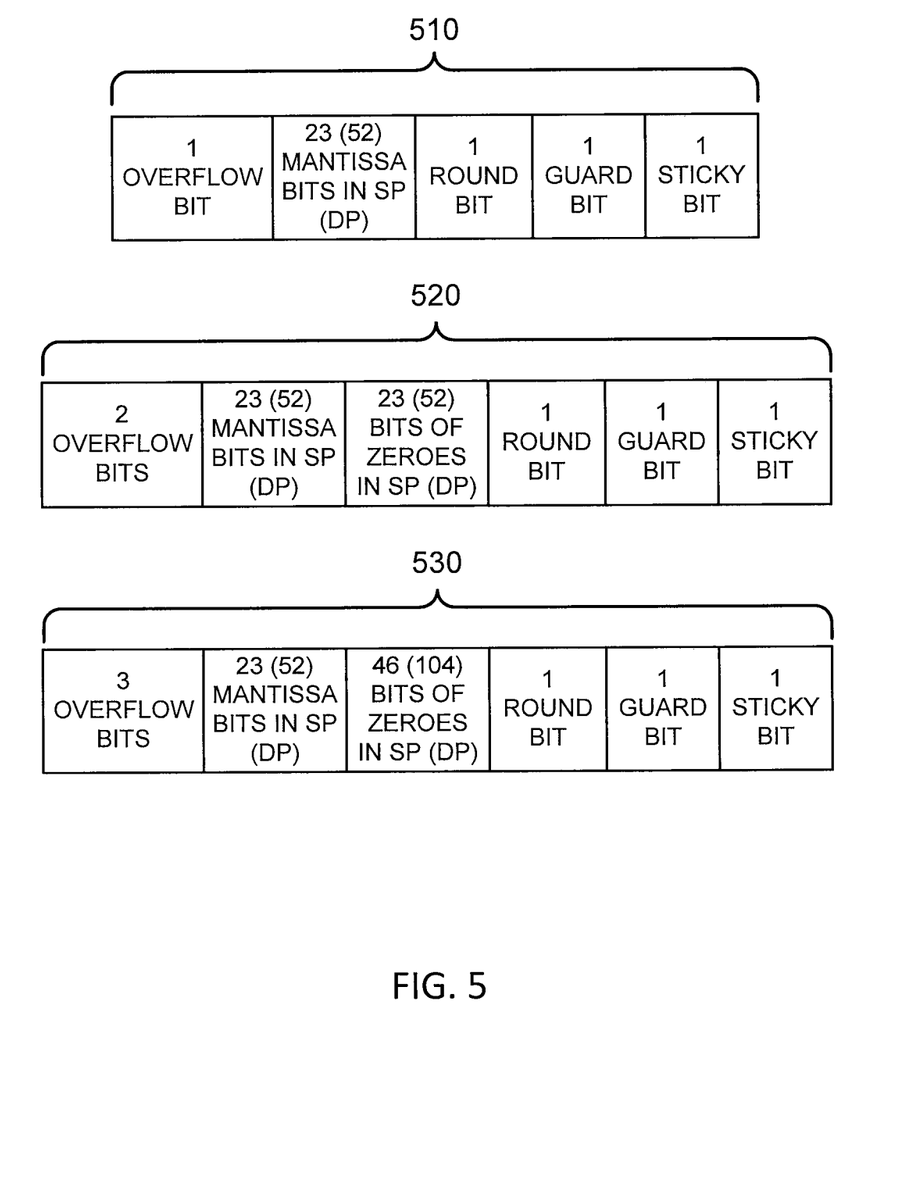
FIG. 5 is a diagram of illustrative extended mantissas produced by dynamic bit extension in accordance with an embodiment of the invention.

Three embodiments of mantissa extensions are illustrated in FIG. 5. Consider the scenario in which the floating-point numbers are single-precision floating-point numbers (i.e., the mantissas of A, B, C, and D are represented by 23 bits). A mantissa extension of a single-precision floating-point number may include a leading overflow bit, and trailing round, guard, and sticky bits (e.g., see 510 in FIG. 5); thus an extended mantissa is represented using 27 bits. In another arrangement, a mantissa extended by adding a leading overflow bit and trailing round, guard, and sticky bits may be represented using 56 bits in the event that floating-point numbers A, B, C, and D are double-precision floating-point numbers (e.g., see 510 in FIG. 5). An adder tree such as adder tree 400 shown in FIG. 3 that uses extended mantissas according to 510 may be able to produce a sum that is at least as accurate as a sum obtained under a worst case scenario using a conventional IEEE754 compliant adder tree architecture (i.e., an adder tree architecture that performs an alignment operation before each adder stage and a normalization operation after each adder stage).

A bit extension according to 520 in FIG. 5 in combination with adder tree 400 may guarantee to produce a sum that is always at least as accurate as a sum obtained using a conventional IEEE754 compliant adder tree architecture when adding up to four floating-point numbers. The bit extension according to 520 may include the round, guard, and sticky bits as well as one overflow bit for every adder stage in the adder tree. For example, the addition of three or four floating-point numbers requires two adder stages (i.e., two overflow bits), the addition of five to eight floating-point numbers requires three adder stages (i.e., three overflow bits, see 530 in FIG. 5), the addition of nine to 16 floating-point numbers requires four adder stages (i.e., four overflow bits), etc.

The bit extension according to 520 may use additional bits to produce the extended mantissa, whereby the number of additional bits depends on the precision of the floating-point number. For example, the mantissa of a single-precision floating-point number may be represented using 23 bits, and the bit extension according to 520 may include multiples of 23 additional bits of zeroes for each additional adder stage above one. For example, the addition of three or four floating-point numbers requires two adder stages, and the mantissa extension of a single-precision floating-point number requires 23 additional bits of zeroes. The addition of five to eight floating-point numbers requires three adder stages and thus two times 23 additional bits of zeroes (i.e., 46 bits of zeroes, see 530 in FIG. 5).

The bit extension stage includes multiples of 52 bits of zeroes in the scenario that the adder tree produces a sum of double-precision floating-point numbers. Thus, the addition of three or four floating-point numbers requires two adder stages implying 52 additional bits of zeroes (see 520), and the addition of five to eight floating-point numbers requires three adder stages implying 104 additional bits of zeroes (see 530).

After the bit extension stage, floating-point numbers A, B, C, and D with exponents and extended mantissas may be fed to intermediate routing stage 410 as shown in FIG. 3. The intermediate routing stage may determine which of the floating-point numbers A, B, C, and D has the biggest exponent and route the floating-point number with the biggest exponent to adder stage 420A. Intermediate routing stage 410 may route all floating-point numbers with an exponent that is smaller than the biggest exponent together with the biggest exponent to shifters 415. Intermediate routing stage 410 may also route floating-point numbers with an exponent equal to the biggest exponent to shifters 415.

Figure 4A:
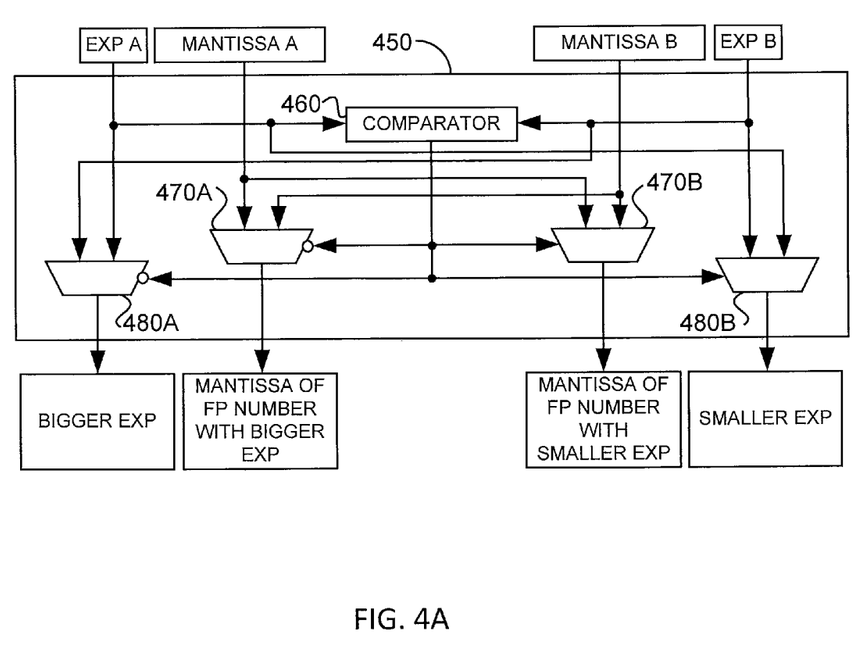
FIG. 4A is a diagram of illustrative circuitry that routes two floating-point numbers based on the size of their respective exponents in accordance with an embodiment of the invention.

An embodiment of an intermediate routing stage such as intermediate routing stage 410 is intermediate routing stage 450 shown in FIG. 4A. Intermediate routing stage 450 may receive the mantissas and exponents of floating-point numbers A and B (i.e., mantissa A and exponent A of floating-point number A and mantissa B and exponent B of floating-point number B). Intermediate routing stage 450 may include a comparator 460 and multiplexers 470A, 470B, 480A, and 480B.

Multiplexers 470A and 470B may each receive the mantissas of floating-point numbers A and B. Multiplexers 480A and 480B and comparator 460 may receive the exponents of floating-point numbers A and B. Comparator 460 may compare the exponents of floating-point numbers A and B. The result of the comparison may be used to select the inputs of the multiplexers in stage 450.

For example, multiplexers 470A and 480A may be directed by the result of the comparison to select the mantissa and the exponent of the floating-point number with the bigger exponent, respectively. Similarly, multiplexers 470B and 480B may be directed by the result of the comparison to select the mantissa and the exponent of the floating-point number with the smaller exponent, respectively.

Figure 4B:
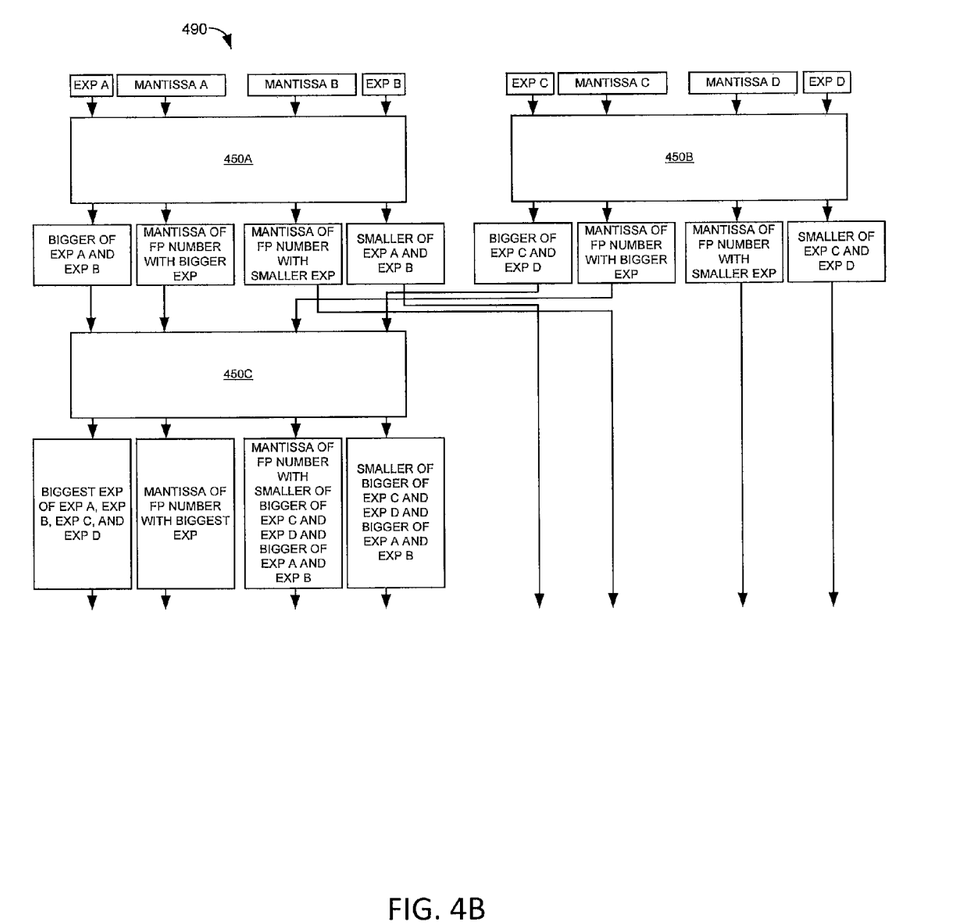
FIG. 4B is a diagram of illustrative circuitry that routes four floating-point numbers based on the size of their respective exponents in accordance with an embodiment of the invention.

Another embodiment of an intermediate routing stage such as intermediate routing stage 410 in FIG. 3 is intermediate routing stage 490 in FIG. 4B. Intermediate routing stage 490 may receive four floating-point numbers A, B, C, and D.

As shown, intermediate routing stage 490 may use intermediate routing stage 450 in a tree-like structure in which intermediate routing stage 450A determines the floating-point number with the bigger exponent between floating-point numbers A and B, and intermediate routing stage 450B determines the floating-point number with the bigger exponent between C and D. Intermediate routing stage 450C may receive the floating-point numbers with the bigger exponents from intermediate routing stages 450A and 450B and produce the floating-point number with the biggest exponent of all four floating-point numbers A, B, C, and D.

Figure 6:
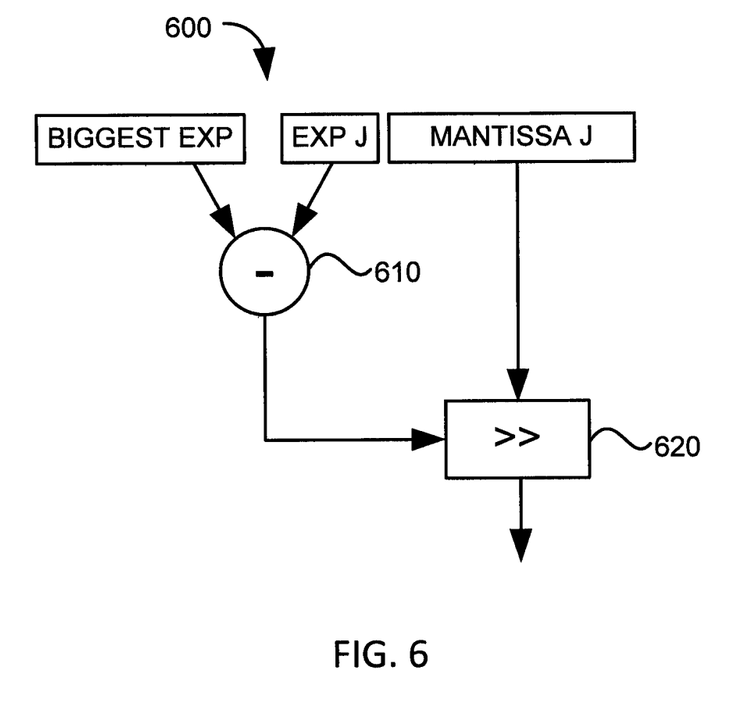
FIG. 6 is a diagram of an illustrative shifting technique to align the mantissas of floating-point numbers in accordance with an embodiment of the present invention.

Intermediate routing stage 410 of FIG. 3 may route all floating-point numbers with an exponent that is smaller than the biggest exponent together with the biggest exponent to shifters 415. An embodiment of a shifter such as shifter 415 is shifter 600 shown in FIG. 6. Shifter 600 may receive the mantissa and exponent of a floating-point number such as floating-point number J. Shifter 600 may also receive the biggest exponent of all the floating-point numbers received by adder tree 400 of FIG. 3. Shifter 600 may subtract the exponent of the floating-point number from the biggest exponent using a subtractor such as subtractor 610. The difference between the biggest exponent and the exponent of the floating-point number may determine the number of bit positions that the mantissa of the floating-point number is shifted to the right by right shifter 620.

Shifters 415 (e.g., shifters 415A, 415B, and 415C) may provide the shifted mantissas to adders 420. Floating-point numbers provided at the output of shifters 415 in this way have been properly aligned.

Adder stages 420A and 420B may receive the aligned floating-point numbers from intermediate routing stage 410 and shifters 415 as shown in FIG. 3. Depending on the signs of the received operands, adder stages 420A and 420B may either implement an addition or a subtraction. For example, in the scenario that the signs of the floating-point numbers received from intermediate routing stage 410 and shifter 415A are the same, adder stage 420A may add the received mantissas of the floating point numbers and send the resulting floating-point number E to adder stage 420C. Floating-point number E may include the sum of the aligned mantissas, the sign bit, and the biggest exponent.

In the scenario that the floating-point numbers received from shifters 415B and 415C have a different sign, adder stage 420B may subtract the received mantissas of the floating-point numbers received from shifters 415B and 415C. Adder stage 420B may also determine the sign bit by comparing the magnitude of the positive and negative floating-point numbers. Alternatively, a subtraction operation may for example be implemented by swapping the sign to positive, converting the mantissa into its 2's complement, and performing an addition. The result of such an operation may be negative. In this case, the mantissa needs to be converted into its 2's complement again and the sign inverted to indicate a negative number. In this scenario, adder stage 420B may send the resulting floating point number F, which consists of the difference of the mantissas, the resulting sign bit, and the biggest exponent to adder stage 420C.

Second adder stage 420C may implement an addition or a subtraction depending on the sign bits as explained above. Any adder stage such as adder stage 420A, 420B, or 420C may produce an overflow (i.e. a floating point number with more than one bit in front of the radix point). In the scenario that an adder stage produces an overflow, adder tree 400 may normalize the floating point number representing the sum. For this purpose, adder stage 420C may send the result of the addition or subtraction to normalization stage 430.

Figure 7:
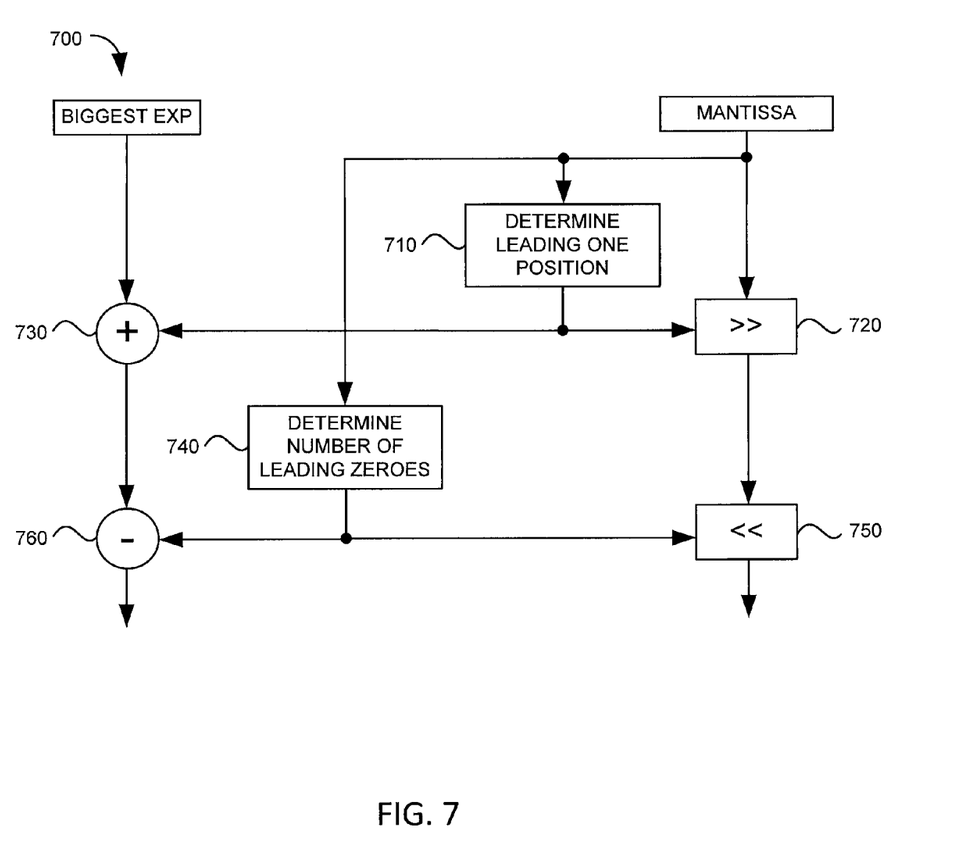
FIG. 7 is a diagram of an illustrative normalization operation on the result of a floating-point addition in accordance with an embodiment of the present invention.

An illustrative embodiment of a normalization stage such as normalization block 430, which may convert the result of adder stage 420C to the same value represented in the IEEE754 standard format is shown as normalization stage 700 in FIG. 7. Block 710 may determine the position of a first "1" in the overflow bits in the mantissa to identify the implied leading "1". The mantissa is then right-shifted in block 720 by the number found in block 710 to obtain a leading "1". In case of a subtraction, the mantissa may have a number of leading zeroes instead of leading "1" position.

Block 740 may determine the number of leading zeroes in the mantissa. The mantissa is then left-shifted in block 750 by the number found in block 740 to obtain a leading "1", which is then eliminated because the leading "1" is implied by the IEEE754 standard.

To convert the biggest exponent, a first offset adjustment is added to the exponent by adder 730 to account for the right shift operation in block 720. A second offset adjustment may be subtracted from the exponent by subtractor 760 to account for the left shift operation in block 750. Hence, the total offset adjustment of the biggest exponent is determined by the difference between the number of the leading "1" position determined in block 710 and the number of leading zeroes determined in block 740.

Any necessary rounding of the normalized floating-point number is performed in block 435 of FIG. 3. Rounding in block 435 may use different rounding schemes. For example, rounding schemes such as round up, round down, round toward zero (which is sometimes also referred to as truncation) or round to the nearest value, where the nearest value may be an integer, an even value, an odd value, or a representable value. Rounding to the nearest value may lead to a tie. In this case, a second round to the nearest value method may be used as a tie breaker. For example, a round to the nearest integer method may be combined with a round to the nearest even method as a tie breaker.

Figure 8:
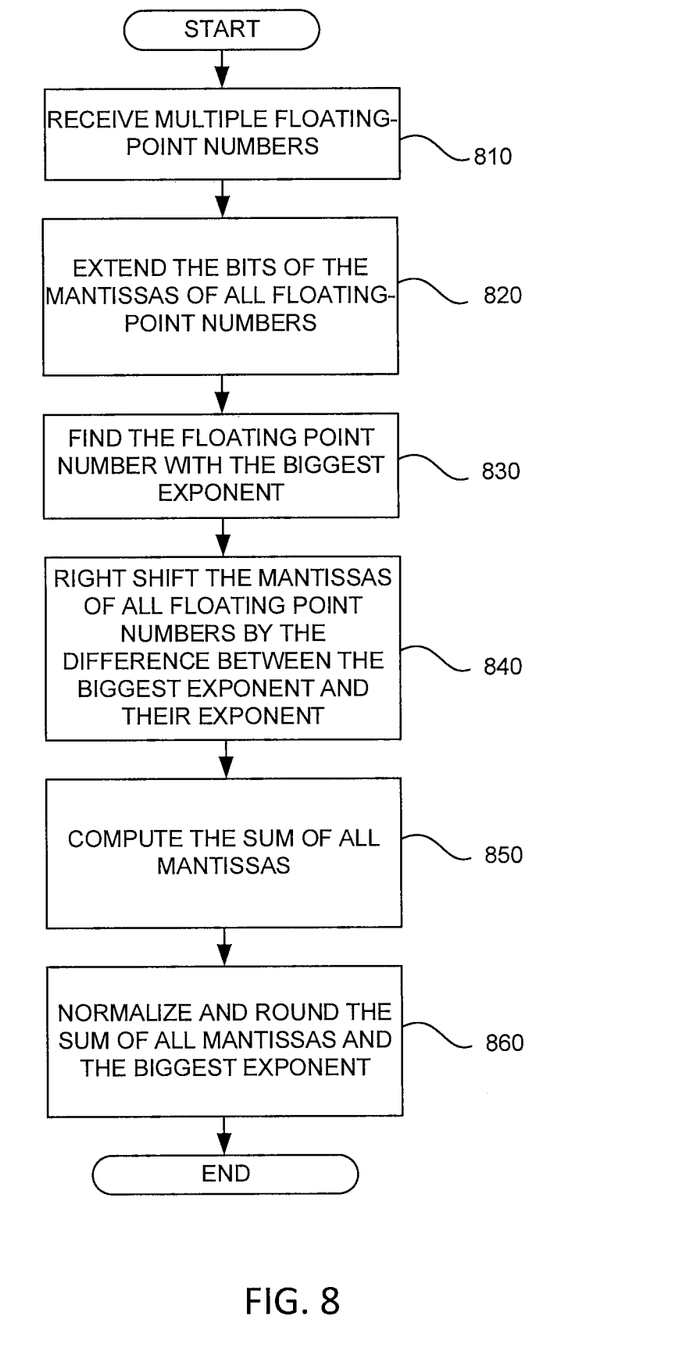
FIG. 8 is a flow chart of illustrative steps for adding floating-point numbers using dynamic bit extension and shifting techniques in accordance with an embodiment of the present invention.

Illustrative steps for performing a floating-point arithmetic operation are shown in the flow chart of FIG. 8. During step 810, a floating-point arithmetic operator such as adder tree 400 in FIG. 3 may receive multiple floating-point numbers. During step 820, the mantissas of the floating-point numbers may be extended. For example, trailing zeroes may be added to the mantissas to increase precision.

Further trailing zeroes may serve as round, guard, and sticky bits. Leading bits may also be added to absorb potential overflow.

The floating-point number with the biggest exponent among the received multiple floating-point numbers may be determined during step 830, and the mantissas of all floating-point numbers may be shifted to the right during step 840. The amount a mantissa of a given floating-point number is shifted to the right may depend on the difference between the biggest exponent and the exponent of the given floating-point number. Thus, the mantissa of a floating-point number with an exponent equal to the biggest exponent may not be shifted.

During step 850, the sum of all mantissas may be produced, which is followed by the normalization and rounding of the sum during step 860.

The method and apparatus described herein may be incorporated into any suitable integrated circuit or system of integrated circuits. For example, the method and apparatus may be incorporated into numerous types of devices such as microprocessors or other ICs. Exemplary ICs include programmable array logic (PAL), programmable logic arrays (PLAs), field programmable logic arrays (FPGAs), electrically programmable integrated circuits (EPLDs), electrically erasable programmable integrated circuits (EEPLDs), logic cell arrays (LCAs), field programmable gate arrays (FPGAs), application specific standard products (ASSPs), application specific integrated circuits (ASICs), just to name a few.

The integrated circuit described herein may be part of a data processing system that includes one or more of the following components; a processor; memory; I/O circuitry; and peripheral devices. The data processing system can be used in a wide variety of applications, such as computer networking, data networking, instrumentation, video processing, digital signal processing, or any suitable other application.

Although the method operations were described in a specific order, it should be understood that other operations may be performed in between described operations, described operations may be adjusted so that they occur at slightly different times or described operations may be distributed in a system which allows the occurrence of the processing operations at various intervals associated with the processing, as long as the processing of the overlay operations are performed in a desired way.

The foregoing is merely illustrative of the principles of this invention and various modifications can be made by those skilled in the art without departing from the scope and spirit of the invention. The foregoing embodiments may be implemented individually or in any combination.

What is claimed is:

1. A method for performing floating-point operations on an integrated circuit, comprising:

receiving a first floating-point number having a first exponent and a first mantissa, a second floating-point number having a second exponent and a second mantissa, and a third floating-point number having a third exponent and a third mantissa, wherein each of the first, second, and third mantissas has a given precision;

with bit extension circuitry on the integrated circuit, expanding the given precision of the first, second, and third mantissas to a greater number to produce corresponding first, second, and third extended mantissas, wherein the greater number is at least twice as big as the given precision; and with shifting circuitry on the integrated circuit, right shifting the first, second, and third extended mantissas to produce first, second, and third shifted mantissas.

2. The method of claim 1, further comprising:
with an adder, computing the sum of the first, second, and third shifted mantissas;
with the adder, sending the sum to a normalization stage; and
with the normalization stage, converting the sum to a standard format.

3. The method of claim 2, wherein right shifting the first, second, and third extended mantissas comprises:
comparing the first, second, and third exponents to identify a dominant exponent, wherein the dominant exponent is at least equal to each of the first, second, and third exponents.

4. The method of claim 3, further comprising:
in response to identifying the third exponent as the dominant exponent, subtracting the first exponent from the dominant exponent to compute a first number of bits and subtracting the second exponent from the dominant exponent to compute a second number of bits.

5. The method of claim 4, wherein right shifting the first, second, and third extended mantissas comprises:
right shifting the first extended mantissa by the first number of bits to produce the first shifted mantissa;
right shifting the second extended mantissa by the second number of bits to produce the second shifted mantissa; and
using the third extended mantissa as the third shifted mantissa.

6. The method of claim 3, further comprising:
determining an adjustment number based on a position of a leading one in the sum;
right shifting the sum by a number of bits based on the adjustment number to generate an adjusted sum; and
adding the adjustment number to the dominant exponent to compute an adjusted exponent.

7. The method of claim 6, further comprising:
determining a number of leading zeroes of the adjusted sum;
left shifting the adjusted sum by a number of bits based on the number of leading zeroes; and
subtracting the number of leading zeroes from the adjusted exponent.

8. The method of claim 2, wherein expanding the given precision of the first, second, and third mantissas comprises:
inserting a number of overflow bits in each of the first, second, and third mantissas, wherein the number of overflow bits is based on a number of mantissas to be added; and
concatenating a round bit, a guard bit, and a sticky bit to each of the first, second, and third mantissas to produce first, second, and third partially extended mantissas.

9. Circuitry that performs floating-point operations, comprising:
at least three inputs, wherein each of the at least three inputs receives a floating-point number with an exponent and a mantissa of a given precision;
a bit extension circuit that receives the floating-point numbers from the at least three inputs and that generates an extended mantissa for each of the received floating-point numbers; and
an intermediate shifting stage that receives the floating-point numbers with the extended mantissas from the bit extension circuit and that produces shifted mantissas based on the extended mantissas and the exponents of the received floating-point numbers.

10. The circuitry of claim 9, further comprising:
a floating-point processing circuit that receives the floating-point numbers with the shifted mantissas from the intermediate shifting stage and that produces a sum of the floating-point numbers;
a normalization circuit that receives the sum from the floating-point processing circuit and converts the sum in accordance with a standard requiring an implied leading bit; and
a rounding circuit that receives the converted sum from the normalization circuit and that rounds the converted sum using a rounding scheme.

11. The circuitry of claim 10, wherein the bit extension circuit adds a number of trailing zeroes to the mantissa of each of the floating-point numbers, wherein the extended mantissa is of at least twice the given precision, and wherein the number of trailing zeroes is based on the given precision.

12. The circuitry of claim 11, wherein the bit extension circuit adds a number of leading zeroes to the mantissa of each of the floating-point numbers to prevent overflow.

13. The circuitry of claim 10, wherein the floating-point processing circuit comprises:
an arithmetic operator circuit that receives the floating-point numbers with the shifted mantissas from the intermediate shifting stage and computes the sum of the floating-point numbers.

14. The circuitry of claim 13, wherein the intermediate shifting stage further comprises:
a right shift stage having inputs and outputs, wherein the outputs of the right shift stage are coupled to the arithmetic operator circuit; and
an intermediate routing stage having inputs and outputs, wherein the inputs of the intermediate routing stage are coupled to the bit extension circuit and the outputs of the intermediate routing stage to the right shift stage and the arithmetic operator circuit, and wherein the intermediate routing stage receives the floating point numbers from the bit extension circuit and selectively routes the floating point numbers to the inputs of the right shift stage and to the arithmetic operator circuit.

15. The circuitry of claim 14, wherein the intermediate routing stage further comprises:
a comparator that is coupled to the inputs of the intermediate routing stage, that receives the exponents of the floating-point numbers with the extended mantissas, and that generates a comparison result by comparing the exponents of the floating-point numbers.

16. The circuitry of claim 15, wherein the intermediate routing stage further comprises:
a circuit that is coupled to the inputs of the intermediate routing stage and the comparator, that receives the floating-point numbers with the extended mantissas and the comparison result, that selects first and second subsets of the floating-point numbers based on the comparison result, and that routes the second subset and the exponent of one of the floating-point numbers of the first subset to the right shift stage and the first subset to the arithmetic operator circuit.

17. The circuitry of claim 16, wherein the right shift stage receives the second subset and the exponent of one of the floating-point numbers of the first subset, and wherein the right shift stage generates for each floating-point number of the second subset the shifted mantissa by right shifting the extended mantissa.

18. A method for using an integrated circuit to process at least three floating-point numbers to perform a floating-point operation, wherein each of the floating-point numbers comprises a mantissa having a given number of precision bits and an exponent, the method comprising:
- with a bit extension circuit, receiving the at least three floating point numbers; and
- with the bit extension circuit, concatenating a number of bits to the mantissas of each of the floating-point numbers to produce corresponding floating-point numbers with extended mantissas, wherein the number of bits is at least twice the given number of precision bits, and wherein the number of bits is based on how many floating-point numbers are involved in the floating-point operation.

19. The method of claim 18, further comprising:
- with a comparator circuit, identifying first and second subsets of floating-point numbers, wherein the exponents of the floating-point numbers in the first subset are equal to each other and greater than the exponents of the floating-point numbers in the second subset; and
- with an adder, computing the sum of the first, second, and third shifted mantissas.

20. The method of claim 19, further comprising:
- for each of the floating-point numbers in the second subset, computing a number of shift bits and right shifting the extended mantissa by the computed number of shift bits.

21. The method of claim 20, wherein computing the number of shift bits for a first floating-point number in the second subset further comprises:
- computing a difference between the exponent of one of the floating-point numbers in the first subset and the exponent of the first floating-point number.

22. The method of claim 20, further comprising:
- inserting a number of overflow bits in each of the extended mantissas, wherein the number of overflow bits is based on how many floating-point numbers are involved in the floating-point operation.

* * * * *